United States Patent [19]

Nakamura et al.

[11] Patent Number: 5,411,197

[45] Date of Patent: May 2, 1995

[54] SOLDERING POT

[75] Inventors: Hideki Nakamura; Tadamichi Ogawa, both of Tokyo, Japan

[73] Assignee: Senju Metal Industry Co., Ltd., Tokyo, Japan

[21] Appl. No.: 139,193

[22] Filed: Oct. 19, 1993

[51] Int. Cl.[6] .............................................. B23K 3/06
[52] U.S. Cl. ...................................... 228/34; 228/37; 228/56.2
[58] Field of Search ..................... 228/34, 37, 56.2, 260

[56] References Cited

U.S. PATENT DOCUMENTS 4,981,249 1/1991 Kawashima et al. ................. 228/37

FOREIGN PATENT DOCUMENTS

| 63-80962 | 4/1988 | Japan | 228/34 |
| 4-143070 | 5/1992 | Japan | 228/34 |
| 4-339562 | 11/1992 | Japan | 228/37 |

*Primary Examiner*—P. Austin Bradley
*Assistant Examiner*—Jeffrey T. Knapp
*Attorney, Agent, or Firm*—Tarolli, Sundheim & Covell

[57] ABSTRACT

A flow of waste fused solder, which has been ejected from ejection nozzles 2, 3 but has not been effectively used during a soldering process, is received in troughs 10 provided on either sides of each of the ejection nozzles 2, 3. The flow of waste fused solder, containing therein oxides, is directed through the troughs 10 into a filtration chamber 13 defined in a vessel body 1. The flow of fused solder is filtrated by means of a partition plate 12 as it flows from the filtration chamber 13 into a solder reservoir 14, so that the oxides in the fused solder are removed. The troughs 10 do not become clogged with the oxides in the fused solder, since the top each of the troughs is opened. Due to an appropriate configuration of the partition plate 12, depending upon difference in specific gravity between the fused solder and the oxides, it is possible to effectively remove oxides from the solder ejection vessel.

2 Claims, 6 Drawing Sheets

SOLDERING POT

BACKGROUND OF THE INVENTION

1. Field of the Invention

This invention relates to a soldering pot or vessel incorporated in an automatic soldering machine for soldering printed circuit boards or the like.

2. Description of the Prior Art

A soldering pot or vessel incorporated in an automatic soldering machine includes a body, a nozzle and a pump. Melting solder supplied from the pump to the nozzle, is spouted upwardly from the nozzle toward a printed circuit board passing over the nozzle for the purpose of soldering. Specifically, the melting solder is flowed out under pressure from the nozzle in a conventional wave manner and contacted with the surface of the printed circuit board. A waste flow of melting solder, which has been spouted from the nozzle onto the printed circuit board but has not been effectively consumed during a soldering process, is recovered in the body for repetitive use. The melting solder collected in the housing has a relatively high temperature, for example, 200 degree-C. The waste flow of melting solder falls into the housing at a speed governed by a head or height difference so as to be mixed with a quantity of melting solder already contained therein. Since the melting solder is contacted with a large quantity of air, it becomes oxidized quickly so as to form oxides. It is preferable that such oxides, due to their degradation, be removed from melting solder, in advance of significant oxidation thereof. In some cases, however, such oxides may remain un-removed in view of economy. However, the oxides easily get caught around the nozzle. In particular, in a case where the nozzle comprises a primary nozzle and a secondary nozzle arranged in a direction in which printed circuit boards are transferred, the oxides are easily deposited between the nozzles. When a large quantity of oxides is deposited, such oxides tend to fall into the pot, or to get caught on a printed circuit board to be soldered so as to form non-soldered portions thereon, thus causing improper soldering.

In order to eliminate the above problems due to the oxides of melting solder, an old-fashioned countermeasure, for example, has been taken which is contradictory to a trend of labor-saving. Specifically, an operator is allocated to remove oxides in the soldering pot by means of a scooper net or spatula. In this regard, it is noted that the operator must remove oxides from the pot, while carefully paying attention to printed circuit boards continuously supplied to the automatic soldering machine. Thus, there is a risk that the operator may erroneously touch a printed circuit board and thereby damage it. There is also a risk that the operator may scald himself with a splash of melting solder.

The applicant has proposed, in Japanese Patent Application No. 03(1991)-8336, a soldering pot in which oxides accumulated around the nozzle are collected in a convenient area for removal, so that the oxides may be removed, without affecting a soldering operation. The soldering pot includes a housing the upper portion of which is separated by a partition plate to form a reservoir. A trough is provided adjacent to the wave soldering nozzle. The trough serves to receive therein a flow of waste melting solder and to direct it through a duct into the reservoir. Oxides, together with melting solder which have flowed into the reservoir will float on the surface thereof, so that they may be removed at an appropriate time.

The wave soldering pot described above is constructed to direct oxides, together with melting solder, into the reservoir through the duct connected to the trough. Thus, the oxides tend to adhere to the inner wall of the duct. The duct will be reduced in its width by the oxides deposited therein after prolonged time of use. As a consequence, the duct becomes blocked, thus making it impossible to recover or remove oxides. When the duct becomes narrowed to such an extent that it is almost blocked with oxides, the oxides, together with melting solder, will overflow from the trough, so as to adversely affect the soldering process. It is also noted that, since a volume of melting solder to be drawn into the wave pump is decreased, the height of melting solder waved from the nozzle may be significantly reduced, thus causing improper soldering.

SUMMARY OF THE INVENTION

Under the circumstances, it is an object of the present invention to collect oxides of a relatively small specific gravity, floating on melting solder in an single area, so that they may be easily removed or recovered from melting solder.

In order to achieve the above object, the invention provides a soldering pot comprising: a body for containing therein a quantity of melting solder; a wave soldering nozzle for waving a flow of the melting solder in said body to an object to be soldered; a trough for receiving a flow of waste melting solder containing oxides therein, which has been waved from said nozzle but has not been effectively consumed during soldering process, and for directing said flow of waste melting solder along an inclined surface thereof; and a partition plate dividing said vessel body into a filtration chamber in communication with said trough and a solder reservoir containing therein a quantity of substantially pure melting solder, said partition plate serving to filtrate a quantity of melting solder, having flown from said trough into said filtration chamber, as it flows into said solder reservoir, so as to prevent said oxides from flowing from said filtration chamber into said solder reservoir.

The invention also provides a solder ejection vessel comprising: a vessel body for containing therein a quantity of fused solder; an ejection nozzle for ejecting a flow of the fused solder in said vessel body to an object to be soldered; a trough for receiving a flow of waste fused solder containing oxides therein, which has been ejected from said ejection nozzle but has not been effectively consumed during a soldering process, and for directing said flow of waste fused solder along an inclined surface thereof; and a cage removably mounted in said vessel body for receiving therein said flow of waste fused solder from said trough, so as to prevent said oxides from passing therethrough and to permit a flow of substantially pure fused solder to pass therethrough into said vessel body.

Due to the above construction, a flow of waste fused solder, which has been ejected from the nozzles but has not been effectively used during soldering process may be received in the troughs. The waste fused solder, together with the oxides, is directed into the filtration chamber defined in the vessel body by means of the partition plate. The oxides are removed by means of the partition plate as the fused solder flows into the solder reservoir. Alternatively, the waste fused solder, together with the oxides, is directed from the troughs into the cage removably mounted in the vessel body. The fused solder is permitted to pass through the cage into the solder reservoir, while the oxides remain trapped in the cage. Thus, it is possible to effectively remove the oxides from the fused solder.

DETAILED DESCRIPTION OF THE PREFERRED EMBODIMENTS

Several embodiments according to the invention will be described in detail below with reference to FIGS. 1 to 6.

Figure 1:
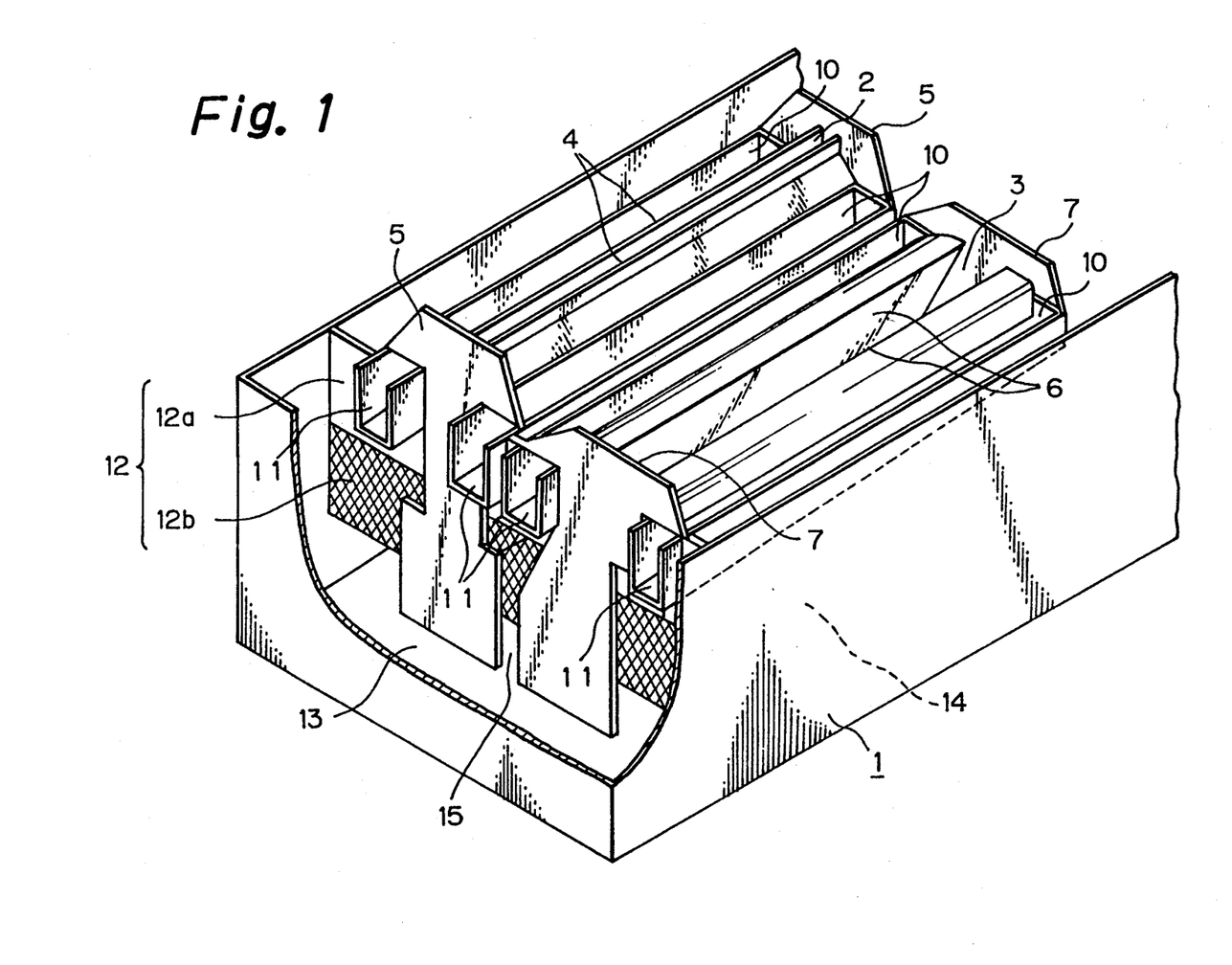
FIG. 1 is a perspective view illustrating a main portion of a solder ejection vessel according to the invention.
Figure 2:
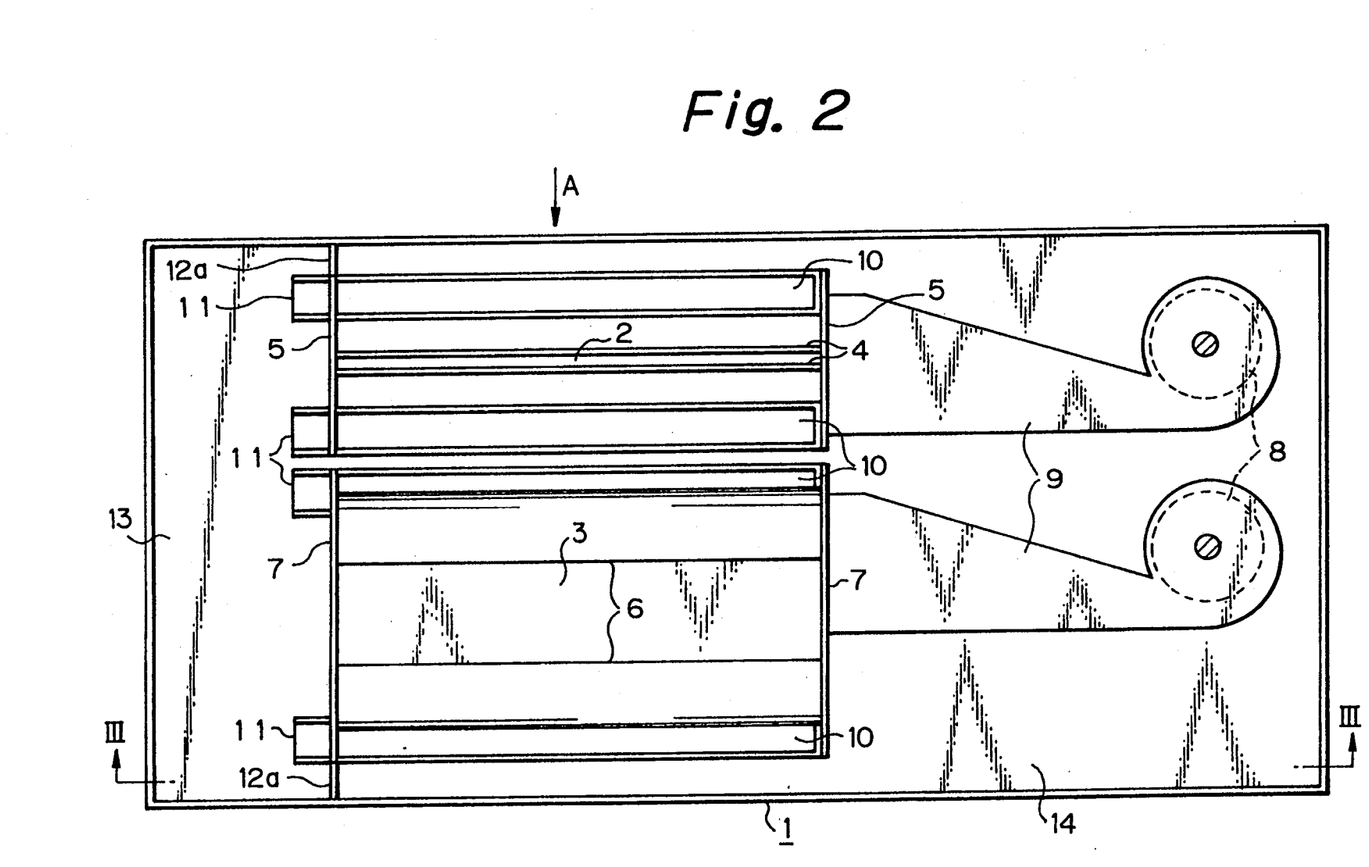
FIG. 2 is a plan view of the solder ejection vessel of FIG. 1.
Figure 3:
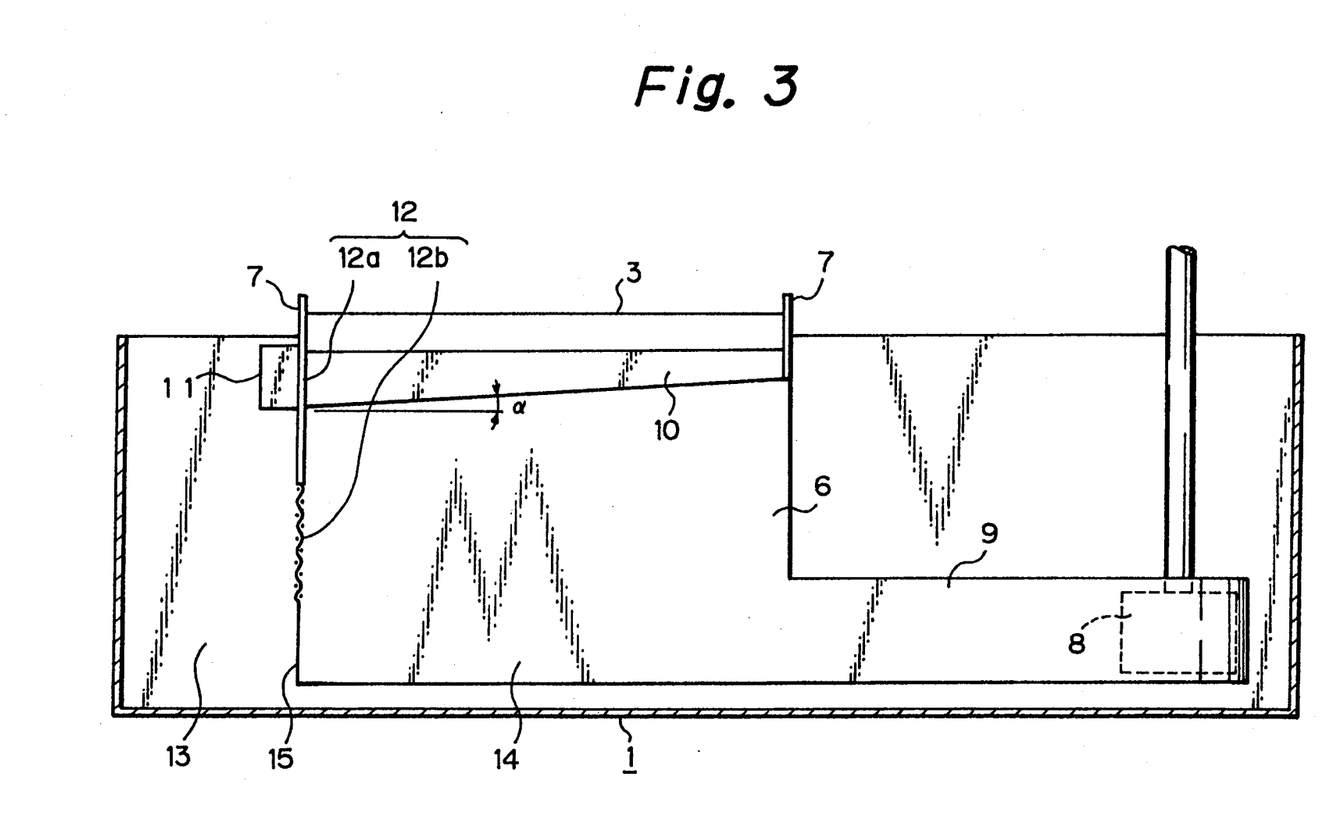
FIG. 3 is a cross-sectional view along line III—III of FIG. 2.

FIG. 1 is a perspective view illustrating a main portion of a solder ejection vessel according to one embodiment of the invention, FIG. 2 is a plan view of the solder ejection vessel showing in FIG. 1, and FIG. 3 is a cross-sectional view along line III—III of FIG. 2.

The solder ejection vessel shown in FIG. 1 includes a vessel body 1 for containing fused solder therein. A primary ejection nozzle 2 (hereinafter, simply referred to as a "primary nozzle") and a secondary ejection nozzle 3 (hereinafter, simply referred to as a "secondary nozzle") are arranged in the vessel body in the direction in which a printed board (not shown), i.e., an object to be soldered, is transferred. The primary nozzle 2 includes a pair of nozzle plates 4 oppositely disposed with a predetermined distance therebetween for defining an ejection port, and a pair of side plates 5 oppositely disposed so as to close the opposite ends of the ejection port. Similarly, the secondary nozzle 3 includes a pair of nozzle plates 6 oppositely disposed with a predetermined distance therebetween for defining an ejection port, and a pair of side plates 7 oppositely disposed so as to close the opposite ends of the ejection port. The primary nozzle 2 and the secondary nozzle 3 are in communication with the respective ejection pumps 8, 8, via ejection ducts 9, 9 respectively. Thus, when motors (not shown) outside the vessel body 1 are energized to actuate the ejection pumps 8, 8, fused solder contained in the vessel body 1 is supplied to the ejection nozzles 2, 3 through the ejection ducts 9, 9, respectively, and ejected from the ejection ports toward a particular printed board.

The printed board to be soldered is transported in a direction shown by an arrow A, and passes immediately over the primary nozzle 2 and secondary nozzle 3 in sequence, so as to be soldered at desired portions. The ejection port of the primary nozzle 3 has a relatively narrow or small opening along the direction of transportation of the printed board. The primary nozzle 2 includes therein waving means (not shown) for causing relatively large waves in the fused solder. Thus, the fused solder ejected from the primary nozzle 2 is forced into small crevices in the printed board, so that fine or close soldering may be performed, without resulting in any non-soldered portion remaining between electronic elements. The ejection port of the secondary nozzle 3 has a relatively broad opening along the direction of transportation of the printed board, so that fused solder ejected from the secondary nozzle will flow in a relatively moderate manner. Thus, improper solder on the printed board, such as dangling solder or bridges, having been produced during a soldering process by means of the primary nozzle 2 may be modified or corrected by the fused solder of a relatively thick in width ejected from the secondary nozzle 3. Due to the secondary soldering operation, which may be referred to as a "finishing soldering", the surface of the printed board to be soldered may be completely soldered.

In order to receive waste or excess fused solder, which has not been attached to the printed board, troughs 10 are provided on either side of each of the nozzles 2, 3. Each trough 10 is dammed up at one end and opened at the other end for defining an outlet port 11. The trough 10 has a bottom wall inclined at an angle alpha toward the outlet port 11. Thus, waste fused solder having been recovered will flow by gravity toward the outlet port 11.

The vessel body 1 is separated by a partition plate 12 of stainless steel into a filtration chamber 13 in communication with the troughs 10 and a reservoir 14 for containing substantially pure fused solder. It is noted that the lower half of the partition plate 12 is made of a stainless mesh. The partition plate 12 includes a shield plate 12a for preventing oxides of solder, having flown into the filtration chamber 13, from overflowing into the solder reservoir 14, and a strip of mesh (i.e., the mesh constituting the lower half of the partition plate) 12b for preventing the oxides therethrough and permitting fused solder therethrough. In the illustrated embodiment, the shield plate 12a is matingly engaged, in a comb-like fashion, between the side plate 5 of the primary nozzle and the side plate 7 of the secondary nozzle, and between the side plates 5, 6 and the inner wall of the vessel body 1. The upper end or edge of the shield plate 12a is at a level above the surface of the fused solder in the vessel body 1, while the lower end or edge of the shield plate 12a is at a level below the surface of the fused solder in the vessel body 1. The mesh web 12b, having opening or pore size smaller than particle size of the oxides, is connected, at the upper end or edge thereof, to the lower edge of the shield plate 12a. The lower end or edge of the mesh web 12b is at a level above the bottom surface of the vessel body 1. Thus, a pathway to permit free flow of the fused solder is formed between the mesh web 12b and the bottom surface of the vessel body 1. Accordingly, the filtration chamber 13 and the solder reservoir 14 are freely communicated with each other by means of the pathway 15.

During soldering process for printed boards, the motors are energized to actuate the ejection pumps 8, 8, so that a flow of fused solder is ejected from each of the nozzles 2, 3. A portion of the fused solder, which has been ejected from the nozzles 2, 3 but was not effectively consumed in a soldering process, i.e., waste or excess solder, is oxidized upon contact with oxygen in the atmosphere to form oxides. The waste or excess solder, together with such oxides flows into the troughs 10 on either sides of each of the nozzles 2, 3. The fused solder and oxides collected in the troughs 10 then flow quickly toward the outlet port 11, by way of the inclination of the troughs 10, into the filtration chamber 13. The fused solder contained in the vessel body 1 is continuously supplied through the pumps 8, so that the fused solder and oxides flown into the filtration chamber 13 are directed into the reservoir 14. In this regard, it is noted that, since the filtration chamber 13 and the solder reservoir 14 are separated from each other, excepting through the pathway 15, fused solder having a specific gravity larger than that of the oxides only passes through the mesh web 12b and the pathway 15 into the solder reservoir 14. On the contrary, the oxides having a specific gravity smaller than that of the fused solder would not precipitate in the fused solder to a degree that they would pass through the pathway 15. Accordingly, the oxides are inhibited to pass through the mesh web 12b and suspended in the fused solder in the filtration chamber 13. Since the shield plate 12a extends to a point above the level or surface of the fused solder, the oxides suspended in the upper portion of the filtration chamber 13 are inhibited to overflow into the solder reservoir 14 and are securely captured within the filtration chamber 13. Thus, it is possible to remove the oxides from the filtration chamber 13 by means of a scooper net or scraper, when a predetermined amount of oxides is accumulated in the filtration chamber 13.

With the solder ejection vessel described above, waste solder having been ejected from the nozzles 2, 3 and collected in the troughs 10, together with the oxides, flows into the filtration chamber 13. In this regard, it is noted that the troughs 10 would not be clogged with the oxides floating in the fused solder flowing through the troughs 10, since the troughs are opened at the top thereof. There is no risk of the oxides floating around the nozzles 2, 3 to adversely affect soldering process of printed boards, as seen in prior art vessels.

The fused solder and oxides flow through the troughs 10 into the filtration chamber 13 defined in the vessel body 1 by means of the partition plate 12. Only the fused solder may flow into the solder reservoir 14 adjacent to the filtration chamber 13, with the oxides remaining in the filtration chamber 13. Thus, it is possible to collect and recover the oxides accumulated in a particular part of the vessel body 1. The filtration chamber 13 is disposed at a location offset from a path through which the printed boards are transported. This reduces the possibility of an operator erroneously putting an object to be soldered, i.e., printed boards, into the vessel body 1, when he tries to remove oxides accumulated in the filtration chamber 13 by means of a scooper net or a spatula. Since it is not necessary for the operator to take care of printed boards during transportation thereof, he is able to concentrate his attention on the recovery of oxides. Burning or scalding of an operator during removal of the oxides, due to splash of fused solder is also prevented. Thus, it is possible to transport printed boards in a continuous manner, while permitting removal and disposal of oxides.

Since the oxides collected in the filtration chamber 13 do not flow into the solder reservoir 14, the solder reservoir 14 contains substantially pure fused solder therein. This prevents problems such as improper soldering due to a variation in the volume of fused solder to be sucked into the pumps 8, or in the height of fused solder to be ejected from the nozzles, thus advantageously increasing operational efficiency and quality of the automatic soldering device.

When the oxides contained in the fused solder, which have flown into the filtration chamber 13 through the troughs 10, float on the surface of the fused solder due to their relatively small specific gravity, the shield plates 12a having no mesh portion prevent such oxides from entering into the solder reservoir 14. It is also noted that, since the lower edge of the mesh web 12b does not extend to the bottom surface of the vessel body 1, the filtration chamber 13 and the solder reservoir 14 are communicated with each other through the pathway 15 defined below the lower edge of the partition plate 12. Accordingly, the fused solder in the filtration chamber 13, having a specific gravity greater than that of the oxides, is permitted to flow into the solder reservoir, while the oxides in the filtration chamber 13 are not allowed to flow into the solder reservoir 14 due to the presence of the mesh web 12b having a sufficient depth and the shield plate 12a for preventing overflow of the oxides. As a result, substantially pure fused solder is solely contained in the solder reservoir 14. This contributes to restrict variations or fluctuations in the liquid level in the solder reservoir 14, which may adversely affect an ejection height of the fused solder from the ejection nozzles 8, thus ensuring that no portions are left unsoldered.

The partition plate 12 is constructed from a shield plate 12a and mesh web 12b both made of stainless steel, as mentioned above, so that it is impossible for the partition plate 12 to be maintained in a constant and steady configuration, regardless of a high circumferential temperature. Accordingly, the partition plate 12 is capable of serving as a filter which permits fused solder at a high temperature, 200 degree-C., for example, to pass therethrough and which prevents oxides contained in the fused solder from passing therethrough. The partition plate 12 of stainless steel may be easily fabricated in a desired configuration depending upon a given configuration of the vessel body 1.

Figure 4:
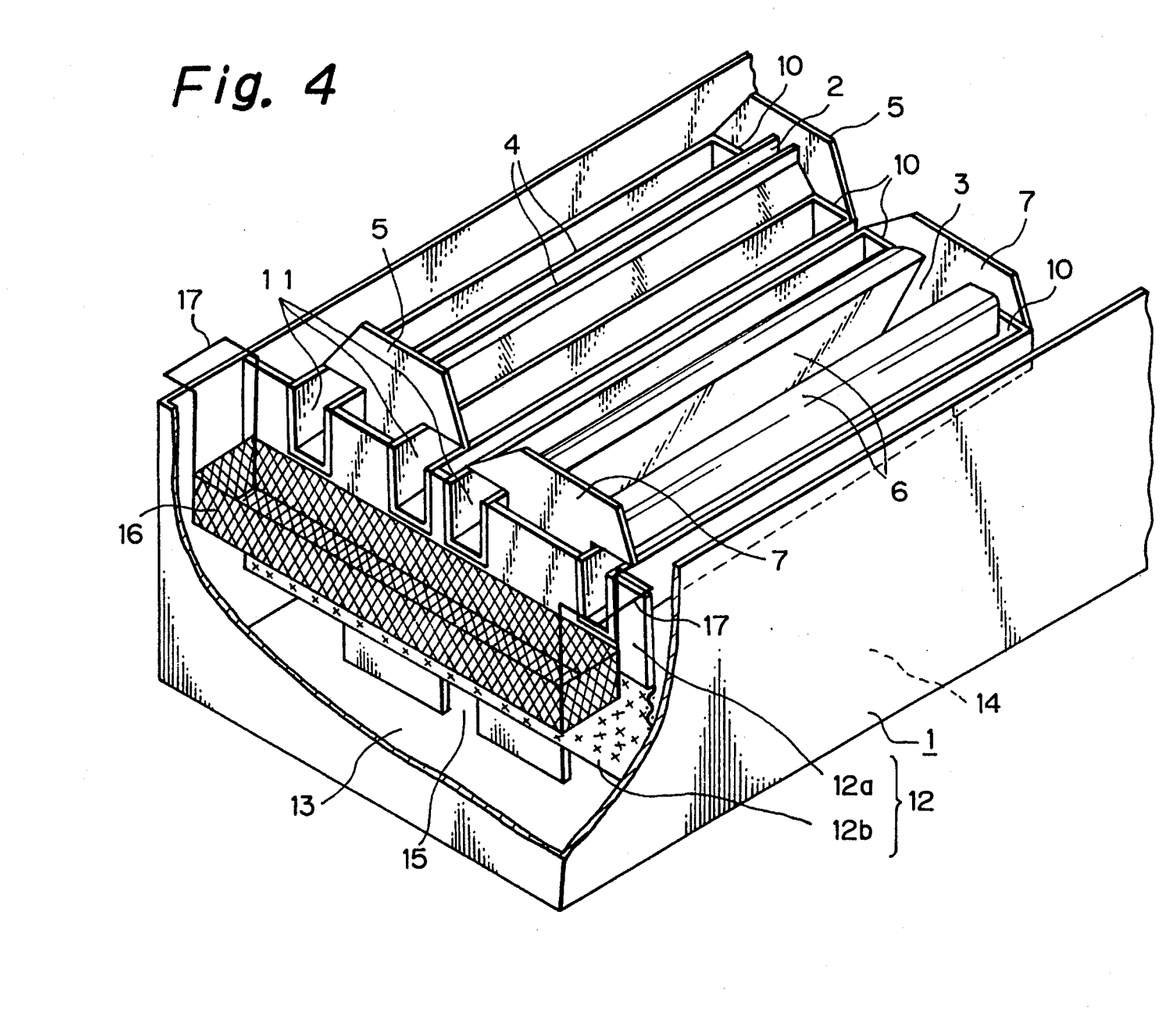
FIG. 4 is a perspective view illustrating a main portion of a solder ejection vessel according to anther embodiment of the invention.
Figure 5:
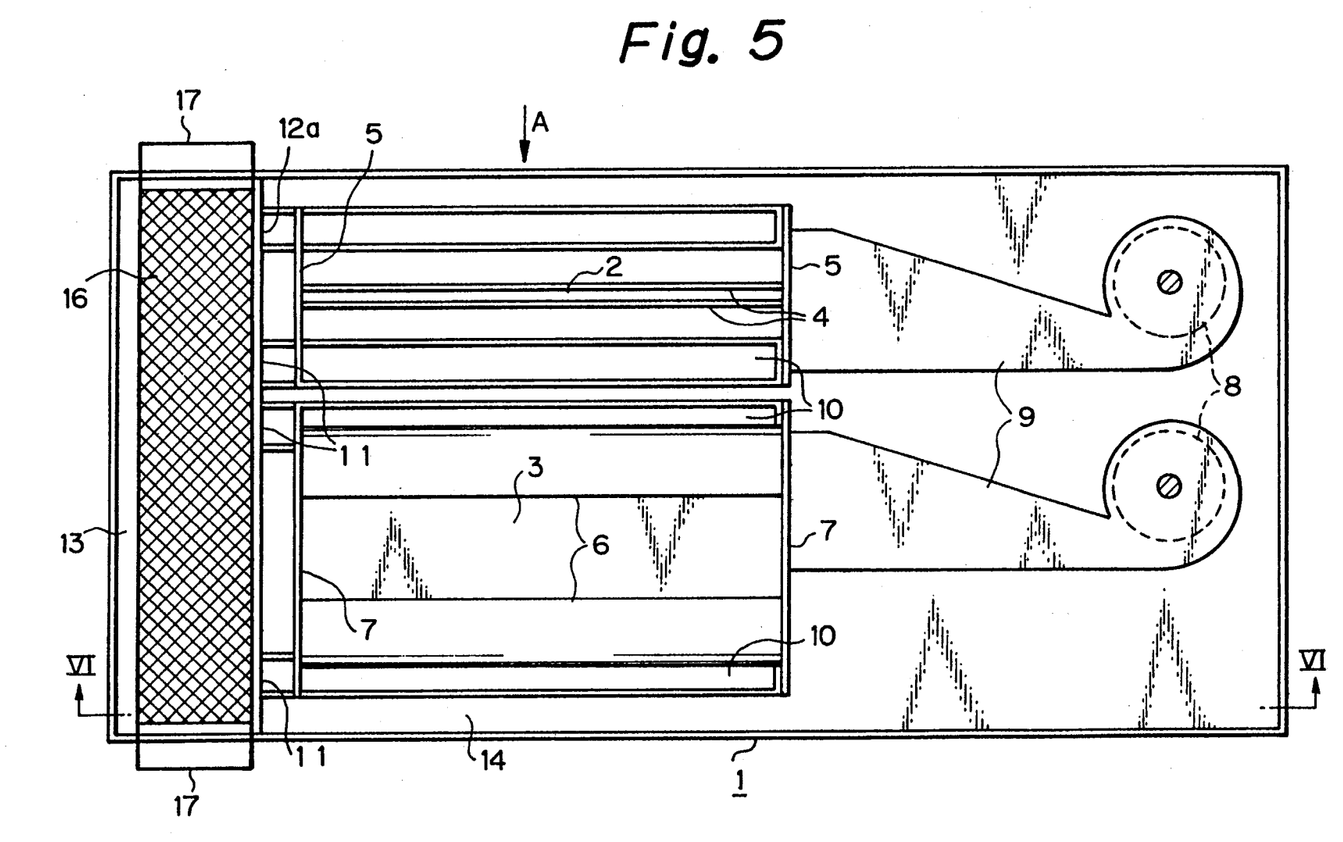
FIG. 5 is a plan view of the solder ejection vessel of FIG. 4.
Figure 6:
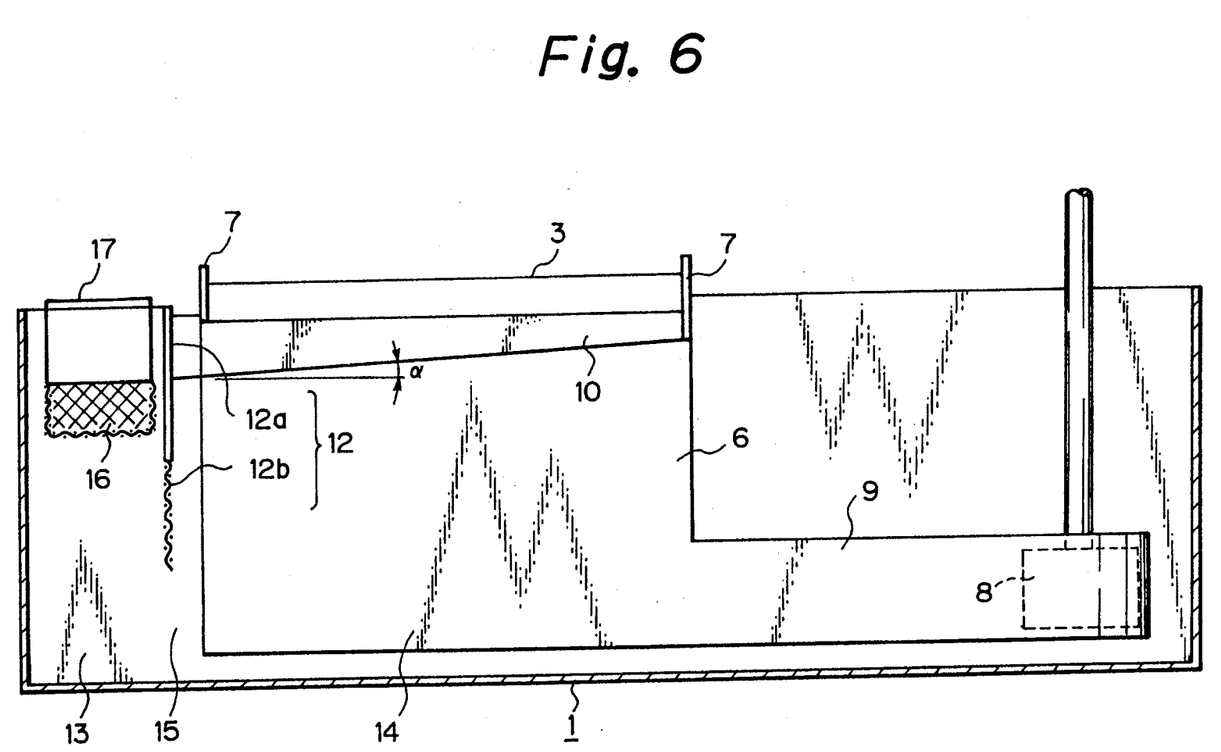
FIG. 6 is a cross-sectional view along line VI—VI of FIG. 5.

In the above embodiment, it is also possible to additionally provide a cage 16 for recovering oxides from fused solder flowing into the filtration chamber from the outlet ports of the troughs 10, as shown in FIGS. 4 to 6. The cage 16 is removably mounted in the vessel body i in order to filtrate or remove oxides prior to their entrance into the filtration chamber 13. Thus, the cages 16 in this embodiment serve as a primary filter for increasing efficiency in removing or recovering oxides. The cage 16 can be fabricated by, for example, forming a strip of stainless mesh into a rectangular parallelepiped configuration. A pair of handles 17 may be attached to the cage 16 so as to facilitate removable attachment thereof to the vessel body 1. Since the cage 16 is made of stainless steel having a specific gravity smaller than that of fused solder, it is necessary to prevent the cage 16 from floating-up. In the illustrated embodiment, the cage 16, when installed in the vessel body 1, is adapted to be fixed to the vessel body, with the handles 17 locked to the vessel body by means of clamps (not shown), so that the upper opening of the cage 16 is at a level corresponding to the lower edge of the outlet ports 11 of each of the troughs 10.

Waste fused solder (a portion of the fused solder having been ejected from the nozzles 2, 3, but not effectively consumed during soldering operation) is partly oxidized upon contact with oxygen in the atmosphere. The thus formed oxides, together with non-oxidized, fused solder flow into the troughs 10. The oxides, together with fused solder, then flow into the cage 16 through the outlet ports 11. The cage 16, having an opening or pore size smaller than the particle size of the oxides, prevents the oxides from passing therethrough. Thus, substantially pure fused solder is permitted to pass through the cage 16 into the filtration chamber 13. Specifically, the oxides flown into the troughs 10, together with waste fused solder, are first recovered by the cage 16, and secondarily recovered by the partition plate 12 defining the vessel body 1 into the filtration chamber 13 and the solder reservoir 14. The oxides recovered during the secondary filtration stage by means of the partition plate 12 are naturally considered to have a particle size smaller than the opening or pore size of the cage 16. Thus, it is possible to remove or recover substantially all oxides by making the opening or pore size of the mesh web 12b smaller than that of the cage 16. When a predetermined quantity of oxides has collected in the cage 16, it is possible for an operator to release the clamps from the handles in order to put the cage 16 out of the vessel body 1. Thus, only the oxides collected in the cage 16 may be disposed of.

In the above embodiment, the solder ejection vessel is designed to have both primary and secondary filtration functions by means of the cage 16 and the partition plate 12 in order to increase filtration efficiency. It is noted, however, that the partition plate 12 may be eliminated so as to remove oxides simply by means of the cage 16. It is also noted that a partition plate made of a web of metal mesh in its entirety, other than the partition plate 12 consisting of the shield plate 12a and web mesh 12b, may be used, since a first filtration effect by means of the cage 16 can be expected.

While, in the above embodiment, the mesh web 12b of the partition plate 12 and the cage 16 are both made of stainless steel, it is possible to use a punched plate (a metal plate formed with a plurality of apertures) for the partition plate 12 or cage 16. Other appropriate sheet material may be used, as long as it is capable of permitting fused solder to pass through the cage and preventing to pass oxides through the cage. Although the invention has been described in the above with reference to the solder ejection vessel 1 provided with the primary ejection nozzle 2 and the secondary ejection nozzle 3, the invention is also applicable to a solder ejection vessel of an over-flow type in which an ejection nozzle of a relatively large opening is provided to permit flow of fused solder in four directions.

In accordance with the invention, a flow of waste fused solder, which has been ejected from the nozzle but has not effectively used during soldering process, is recovered, together with oxides, in the troughs. The flow of waste fused solder is then directed into the filtration chamber defined in the vessel body. The oxides are filtrated or removed from the fused solder by means of the partition plate, when the fused solder flows through the partition plate into the solder reservoir. Thus, the oxides and waste fused solder flow through the troughs, having no covers or the like to close the top portion thereof, into the filtration chamber, so that the flow paths provided by the troughs will not be blocked with the oxides floating on the fused solder flowing through the troughs. This contributes to eliminate any oxides drifting around the nozzles, which may adversely affect a soldering process of printed boards. The fused solder, together with the oxides, flown into the filtration chamber is permitted to pass through the partition plate into the solder reservoir. The partition plate prevents the oxides in the filtration chamber from passing therethrough into the solder reservoir. Thus, the oxides may be collected in the vessel body at a particular location. The filtration chamber may be located at a position remote from the path along which printed boards are transferred. This reduces the possibility of an operator erroneously putting an object to be soldered, i.e., printed boards, into the vessel body, when trying to remove oxides accumulated in the filtration chamber by means of a scooper net or a spatula. Since it is not necessary for an operator to take care of printed boards during transportation thereof, he is able to concentrate his attention on the recovery of oxides. Burning or scalding of an operator, during removal of oxides, due to splashing of fused solder may be prevented. Thus, it is possible to transport printed boards in a continuous manner, while permitting removal and disposal of oxides. Since the oxides collected in the filtration chamber do not flow into the solder reservoir, the solder reservoir contains substantially pure fused solder. This prevented problems such as improper soldering due to a variation in the volume of fused solder to be sucked into the pumps, or in the height of fused solder to be ejected from the nozzles, thus increasing operational efficiency.

The partition plate is constructed from a mesh web or a punched-plate both made of stainless steel, as mentioned above, so that it is impossible for the partition plate to be maintained in a constant and steady configuration, regardless of a high circumferential temperature. Accordingly, the partition plate is capable of serving as a filter which permits fused solder at a high temperature, 200 degree-C., for example, to pass therethrough and which prevents oxides contained in the fused solder from passing therethrough. The partition plate of stainless steel may be easily fabricated in a desired configuration depending upon a given configuration of a vessel body.

The partition plate is constructed from a shield plate and mesh web. The mesh web prevents oxides passing therethrough. The shield plate has an upper edge located above the surface of the fused solder in the vessel body, and a lower edge located below the surface of the fused solder. The mesh web has an upper edge connected to the lower edge of the shield plate, and a lower edge located above the bottom surface of the vessel body. Thus, when oxides contained in a fused solder which have flowed into the filtration chamber through the troughs, float on the surface of the fused solder due to their relatively low specific gravity, the shield plates having no mesh portion prevent such oxides from passing into the solder reservoir. It is also noted that, since the lower edge of the mesh web does not extend to the bottom surface of the vessel body, the filtration chamber and the solder reservoir are communicated with each other through the pathway defined below the lower edge of the partition plate. Accordingly, the fused solder in the filtration chamber, having a specific gravity greater than that of the oxides, is permitted to flow into the solder reservoir, while the oxides in the filtration chamber are not permitted to flow into the solder reservoir due to the presence of a mesh web of sufficient depth and a shield plate for preventing overflow of the oxides. As a result, substantially pure fused solder is solely contained in the solder reservoir. This contributes a restriction of variations or fluctuations in the liquid level in the solder reservoir, which may adversely affect an ejection height of the fused solder from the ejection nozzles, thus making it possible to prevent any portions from remaining unsoldered.

The cage is constructed from a mesh web or a punched-plate made of stainless steel, as mentioned above, so that it is not possible for the cage to be maintained in a constant and steady configuration, regardless of a high circumferential temperature. Accordingly, the cage is capable of serving as a filter which permits fused solder at a high temperature, 200 degree-C., for example, to pass therethrough and which prevents oxides contained in the fused solder from passing therethrough. The cage of stainless steel may be easily fabricated in desired configuration depending upon given configuration of the vessel body, and may be reliably handled during attachment to or removal from the vessel body.

In accordance with the invention, a flow of waste fused solder, together with oxides, is directed into a cage removably mounted in the vessel body. The fused solder, separated from the oxides by means of the cage, is then directed into the solder reservoir. Thus, the oxides flowing through the troughs provided on either side of each of the nozzles may be removed from the fused solder by means of the cage disposed adjacent to the outlet ports of the troughs, without the use of the partition plate. The cage may be removed from the vessel body in order to dispose of the oxides. Accordingly, it is unnecessary to use a scooper net or a spatula in order to remove or recover the oxides from the vessel body. This contributes to easy and safe removal work. An operator may thereby avoid erroneous or inadvertent handling of printed boards, which may cause such printed boards to fall into the vessel body, or burn accidents due to splashing of fused solder.

Furthermore, and in accordance with the invention, a flow of waste fused solder from the troughs may be returned to the solder reservoir via the cage. Thus, substantially all the oxides may be removed from the fused solder by means of a first filtration effect of the cage and a second filtration effect of the filtration chamber. A multi-staged filtration effect may be further increased by employing a partition plate having a mesh web, serving as a second filter, of an opening or pore size smaller than that of the cage serving as a second filter. The oxides collected in the cage may be easily recovered and disposed of at an appropriate time during operation.

What is claimed is:

1. A solder ejection vessel comprising: a vessel body for containing therein a quantity of fused solder; an ejection nozzle for ejecting a flow of the fused solder in said vessel body to an object to be soldered; a trough for receiving a flow of waste fused solder containing oxides therein, which has been ejected from said ejection nozzle but has not been effectively consumed during soldering process, and for directing said flow of waste fused solder along an inclined surface thereof; a cage removably mounted in said vessel body for receiving therein said flow of waste fused solder from said trough, so as to prevent said oxides from passing therethrough and to permit a flow of substantially pure fused solder to pass therethrough into said vessel body; and a partition plate dividing said vessel body into a filtration chamber in communication with said trough and a solder reservoir containing therein a quantity of substantially pure fused solder, said partition plate serving to filtrate a quantity of fused solder, having flown from said trough into said filtration chamber, as it flows into said solder reservoir, so as to prevent said oxides from flowing from said filtration chamber into said solder reservoir.

2. A solder ejection vessel comprising:
a vessel body for containing therein a quantity of fused solder;
an ejection nozzle for ejecting a flow of the fused solder in said vessel body to an object to be soldered;
a trough for receiving a flow of waste fused solder containing oxides therein, which has been ejected from said ejection nozzle but has not been effectively consumed during a soldering process, and for directing said flow of waste fused solder along an inclined surface thereof;
an a partition plate dividing said vessel body into a filtration chamber in communication with said trough and a solder reservoir containing therein a quantity of substantially pure fused solder, said partition plate serving to filtrate a quantity of fused solder, having flown from said trough into said filtration chamber, as it flows into said solder reservoir, so as to prevent said oxides from flowing from said filtration chamber into said solder reservoir;
said partition plate including a shield plate and a mesh web, said shield plate being arranged so that the upper end thereof is positioned at a level above the surface of the fused solder in said vessel body, and the lower end thereof is positioned at a level below said surface of the fused solder, said mesh web being arranged, with the upper end thereof connected to said lower end of said shield plate and the lower end thereof positioned above the bottom surface of said vessel body, so as to prevent said oxides from passing therethrough.

* * * * *